US012775334B2

(12) United States Patent
Zhang et al.

(10) Patent No.: US 12,775,334 B2
(45) Date of Patent: Oct. 27, 2026

(54) HAPTIC RESPONSE REGULARIZATION FOR HAPTIC BUTTONS OF PORTABLE ELECTRONIC DEVICES

(71) Applicant: Apple Inc., Cupertino, CA (US)

(72) Inventors: Lei Zhang, Fremont, CA (US); Shingo Yoneoka, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/896,814

(22) Filed: Sep. 25, 2024

(65) Prior Publication Data

US 2025/0110560 A1 Apr. 3, 2025

Related U.S. Application Data

(60) Provisional application No. 63/541,369, filed on Sep. 29, 2023.

(51) Int. Cl.
*G06F 3/01* (2006.01)
*B06B 1/04* (2006.01)
*G08B 6/00* (2006.01)

(52) U.S. Cl.
CPC .............. *G06F 3/016* (2013.01); *B06B 1/045* (2013.01); *G08B 6/00* (2013.01)

(58) Field of Classification Search
CPC ............ G06F 3/016; B06B 1/045; G08B 6/00
See application file for complete search history.

(56) References Cited

U.S. PATENT DOCUMENTS 5,736,797 A 4/1998 Motohashi et al.
9,607,491 B1 3/2017 Mortimer et al.
10,232,714 B2 3/2019 Achinger
10,345,907 B2 7/2019 Hajati et al.
10,890,973 B2 1/2021 Hajati
10,976,824 B1 4/2021 Amin-Shahidi et al.
12,212,208 B2 1/2025 Amin-Shahidi et al.
2006/0028072 A1 2/2006 Iwasa et al.
2010/0309141 A1 12/2010 Cruz-Hernandez et al.
2013/0200732 A1 8/2013 Jun et al.
2014/0202252 A1 7/2014 Umehara
2016/0336842 A1 11/2016 Chun
2017/0085165 A1 3/2017 Hajati et al.
2018/0004293 A1 1/2018 Bella et al.
2018/0021812 A1 1/2018 Akanuma et al.
2018/0095293 A1 4/2018 Yeon et al.
2018/0236488 A1 8/2018 Miyazaki
2018/0241293 A1 8/2018 Miyazaki
2018/0342937 A1 11/2018 Mao
2020/0001326 A1 1/2020 Takahashi et al.
2020/0052567 A1 2/2020 Yamada et al.
2021/0096647 A1* 4/2021 Amin-Shahidi ........ G06F 3/016
2021/0099062 A1 4/2021 Tarelli et al.
2024/0103624 A1 3/2024 Chen et al.
2025/0062669 A1* 2/2025 Takahashi ............ H02K 11/215

* cited by examiner

*Primary Examiner* — Robert J Michaud

(74) *Attorney, Agent, or Firm* — Brownstein Hyatt Farber Schreck, LLP

(57) ABSTRACT

A user input component for an electronic device includes a haptic engine, a pressing surface, and a force sensor. The force sensor detects force applied by a user to the pressing surface and from this value and a spring constant of a supporting structure, an approximate displacement distance can be determined. The displacement distance can be used either directly or indirectly to select a drive current for a coil configured to provide haptic effect along the same direction of the user pressing force.

20 Claims, 4 Drawing Sheets

HAPTIC RESPONSE REGULARIZATION FOR HAPTIC BUTTONS OF PORTABLE ELECTRONIC DEVICES

CROSS REFERENCE TO RELATED APPLICATION(S)

This application is a nonprovisional patent application of and claims the benefit of U.S. Provisional Patent Application No. 63/541,369, filed Sep. 29, 2023 and titled "Haptic Response Regularization for Haptic Buttons of Portable Electronic Devices" the disclosure of which is hereby incorporated herein by reference in its entirety.

TECHNICAL FIELD

Embodiments described herein relate to haptic buttons for portable electronic devices and, in particular, to regularization of output from haptic output subsystems thereof.

BACKGROUND

A user input component configured for an electronic device can detect when a user applies a pressing force to a surface of that component. Traditional examples include buttons and keys that close an electrical switch in response to a user pressing force exceeding a threshold required to deform a compressible membrane or spring.

Electronic devices may also include haptic output systems to enhance the interaction experience of a user when engaging with a user input component. Specifically, a haptic output may be triggered when a user-exerted pressing force exceeds one or more defined thresholds. However, environmental conditions-among other frequently-occurring effects—can change a user-perceived amount of force required to actuate the user input component and to receive the corresponding haptic output, resulting in an inconsistent user experience.

SUMMARY

Embodiments described herein take the form of an electronic device including at least a housing defining an aperture and a user input component. The user input component includes a body defining an interface surface extending at least partially through the aperture of the housing, a coupling elastically connecting the body to the housing such that the body is movable with respect to the housing in response to a user pressing force applied to the interface surface, a strain sensor coupled to the coupling, and a haptic engine coupled at least partially to the body. The haptic engine includes a coil and an attraction plate separated in absence of the user pressing force from a coil core by a first gap (which may be between 0-2 mm in some embodiments).

The user input component also includes a processor operably coupled to the strain sensor and the core and configured to: sample the strain sensor to determine a magnitude of the user pressing force; determine, from a spring constant associated with the coupling, a second gap corresponding to a displacement of the body in response to the user pressing force; determine a real-time distance separating the core and attraction plate by subtracting the second gap from the first gap; based on the real-time distance separating the core and attraction plate; selecting a magnitude of current to drive the coil; and causing the selected magnitude of current (e.g., 0-2 A in some embodiments) to be applied to the coil.

Further embodiments described herein take the form of a method of regularizing haptic output of a haptic engine of a user input component for a portable electronic device, the method including the operations of: determining a magnitude of force input applied by a user to an interface surface of the user input component; determining a displacement of the interface surface resulting from the force input; determining a gap separating two attracting components of the haptic engine based on the displacement; and determining an electric current to apply to drive the haptic engine based on the determined gap.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
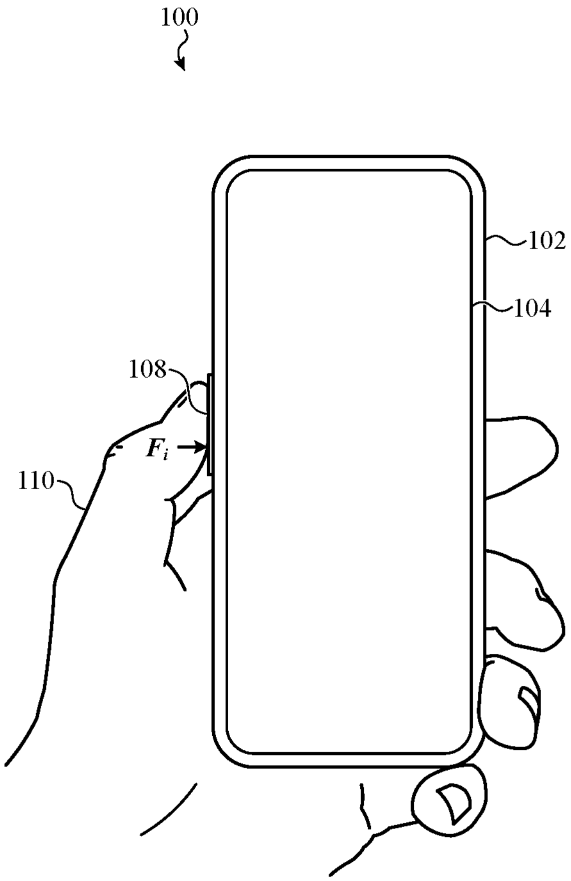
FIG. 1 depicts an example portable electronic device including a haptic button as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to user input components for electronic devices. Specifically, user input components that are configured to receive a user pressing force exerted by a user against a surface of an electronic device, such as a surface of a keycap, a surface of a button cap, or an input surface defining a portion of an exterior of a housing of an electronic device (e.g., trackpad surface). In many embodiments, user input components can be conductively and/or mechanically coupled to an electrical circuit that, in turn, signals a processor of the electronic device to perform a function.

A conventional example of a user input component implemented as a button of a portable electronic device. The button can include a surface to receive user pressing force, the surface being positioned opposite a compressible dome formed from an elastically deformable material such as metal, silicone, or plastic. Upon application of a pressing force that exceeds an clastic deformation threshold of the compressible dome, the compressible dome compresses and closes an electrical circuit. The electrical circuit may be coupled to an interrupt input of a processor or, in other cases, may be periodically scanned at a scan interval by a processor or other analog or digital circuit for open or closed status.

In either case, open or closed circuit status of the button can be used to signal a user intent to the electronic device to perform a function associated with the button. Simply, the electronic device may be a cellular phone and the function may be an instruction to increase volume by an increment. In this example, a user pressing force exerted against the button causes the dome to collapse, completing a circuit, and causing the electronic device to increase volume. A person of skill in the art appreciates that buttons for electronic device can be configured in a number of ways, and the functions associated with those buttons can vary by electronic device, electronic device mode, user preferences, or in any other suitable manner. Generally and broadly, in these examples, the user input component is operating as an electrical switch.

Other example user input components configured to operate as an electrical switch in response to receiving a user pressing force include selection functions of trackpads, displays, sliding elements, multi-stable selector switches, buttons integrated into other input components (e.g., buttons integrated into rotating input devices such as watch crowns, rotating knobs, and the like), keys for keyboards, and so on. Many such conventional elements include a compressible structure, such as a compressible dome, a spring-biased scissor or butterfly mechanism, or a compressible material such as an low durometer elastomeric material. Some user input components have large travel or throw (e.g., on the order of several millimeters to centimeters), others have short travel or throw (e.g., on the order of approximately two millimeters or less), while others still have very short travel or throw that may be perceivable by a user's sense of touch, but may not be readily visible (e.g., on the order of 100s of micrometers).

In some modern constructions, a user input component may operate as an input sensor, rather than closing an electrical circuit. For example, a user input component may include a capacitive sensing construction in which a first plate of a capacitor is mechanically moved closer to a second plate of the capacitor in response to a user pressing force. In this example, capacitance and/or change in capacitance can be sampled at a sampling rate by a processor or electrical circuit. Once the capacitance and/or change in capacitance satisfy a threshold, the electronic device can perform an associated function. Other similar examples of user input components operating as input sensors include input components with piezoelectric force sensors, capacitive force sensors, ultrasonic force sensors, strain-based forces sensors, and the like.

As known to a person of skill in the art, user input components configured to operate as switches naturally exhibit a mechanical response with which users are familiar—the mechanical response of a collapsing elastic structure, such as a compressible dome. Specifically, a user exerting a pressing force against an input surface of a conventional switch expects to apply an increasing pressing force against mechanical resistance until the resistance gives way suddenly, indicating collapse of the elastic structure and closure of the associated switch, which in turn serves as a haptic and tactile indication to the user that the function associated with the switch has been received by the electronic device. In other cases, one or more detents may be used to indicate different modes or states. More simply, the mechanical response curve of conventional user input components (configured as switches) serves as a haptic indication to the user that an instruction has been received.

User input components configured to operate as sensors, however, do not exhibit the same mechanical response curve of switches. For example, some user input components may exhibit a linear response that can be effectively modeled by a spring constant—the more pressing force applied by the user, the more mechanical resistance the user input components applies to the user in response. In many cases, the more pressing force applied by the user, the less marginal (additional) distance the user input component travels. As a result, there is no haptic or tactile feedback to a user to indicate whether a particular application of pressing force was received as an input by the electronic device. In some cases, users may apply significantly higher pressing force than required (or for which a device is designed to receive), or may become frustrated and discontinue use of the input component or the electronic device altogether.

To account for these disadvantages of user input components configured to operate as sensors, some electronic devices include haptic engines to provide haptic feedback that signals to a user when an input has been received. Some devices actuate a vibration feedback element (e.g., eccentric motor, weighted linear actuator), whereas others provide an input signal to a piezoelectric actuator, voice coil actuator, Lorenz actuator, or other actuator. In many examples, haptic actuators can be driven in response to a user pressing force exceeding a threshold, such as a threshold amount of force applied. These haptic actuations, however, do not accurately duplicate a user experience of providing a pressing force to a conventional switch as haptic actuators often provide generalized haptic output not localized to the user input component itself.

Embodiments described herein relate to user input components configured as sensors that include a haptic actuator subsystem configured to emulate a mechanical response curve of a conventional switch. In particular, a user input component as described herein includes a body that defines a user input surface to receive user pressing force. The body is mechanically and elastically coupled via a coupling (e.g., via a linkage, spring mechanism, elastic adhesive, and so on) to an electronic device housing. In this manner, as a user exerts a pressing force against the body, the body moves a distance relative to the housing, the distance defined at least in part by the elastic properties of the coupling. In this manner, the coupling can be modeled as a mechanical spring and can be described with a spring constant k.

The user input component also includes a haptic engine that includes an attraction plate and an inductor (also referred to as a voice coil or an electromagnetic actuator). The inductor can include a ferritic or austenitic core, or a core formed form another flux directing or concentrating material although this is not required of all embodiments. The inductor is separated by a distance from the attraction plate, which may be made from a ferromagnetic material. In some cases, the attraction plate may be a permanent magnet although this is not required of all embodiments. The attraction plate is separated from the inductor by a distance. In this construction, when an electric current passes through the inductor, a magnetic field is induced which attracts the attraction plate and exerts a force on the attraction plate, the force oriented toward the inductor and having a magnitude defined by the magnitude of current passing through the inductor.

In many constructions, the attraction plate is coupled to the body of the user input component and the inductor is mechanically coupled to the housing of the electronic device, either directly or indirectly. As a result, when the inductor receives an electrical current, it can operate to exert a pulling force against the body and against the spring resistance imparted by the coupling, drawing the body at least partially into the housing of the electronic device. In other cases, the relative orientations of the inductor and attraction plate may be reversed—the inductor can be coupled to the body of the user input component and the attraction plate may be coupled mechanically either directly or indirectly to the housing of the electronic device. In some cases, multiple coils and/or multiple attraction plate pairs may be included in the same orientation or in different orientations; many constructions are possible. For simplicity of illustration the embodiments that follow reference a construction in which a voice coil/electromagnetic actuator/inductor is coupled to a body of a user input component but it is appreciated that this is merely one example construction.

This architecture can be used to reproduce the sudden reduction in pressing force resulting from collapse of a collapsible dome experienced by a user pressing a conventional mechanical switch. More simply, the coil and attraction plate can be actuated to exert a force on the body that is aligned with the user pressing force. In this construction, the user experiences a drop in resistance to pressing force in much the same way that collapse of a collapsible dome is felt.

As a simple example, a user input component includes a coupling that can be modeled using Hooke's Law with a spring constant k. The user applies a pressing force $F_1$ that in turn causes the body to displace by an amount $d_1$. In this example, the user pressing force $F_1$ is the only force acting on the body. As current is passed through the coil, the coil can generate a magnetic field that attracts the attraction plate and body. This second force $F_2$ is oriented parallel to $F_1$ so that the net force acting on the body is $F_1+F_2$, which in turn increases the displacement of the body by an amount $d_2$. In this example, the user pressing force has remained constant, but displacement has increased without additional user effort. In this manner, the user perceives that the body has given way in much the same manner as a collapsing dome.

The foregoing architecture can effectively simulate a haptic sensation of pressing a conventional switch that includes an elastic structure. However, field conditions may inform how much force assistance (i.e., how much current passed through the coil) should be imparted by the haptic actuator subsystem so as to maintain consistent user experiences. For example, a first user that applies a high magnitude pressing force displaces the attraction plate to a larger degree than a second user that applies a lighter pressing force. As a result, when the coil is actuated in the first instance the magnitude of attractive force applied to the body is greater than in the second instance because the attraction plate is closer to the core of the coil when the attractive magnetic field is generated. In this manner, the first user feels a larger "break" than the second user; the user experiences undesirably differ.

In another example, the same user may apply slightly different forces at different times when engaging with the same button of the same electronic device. In a first instance, the user applies a higher force and causes a larger displacement and receives a larger haptic effect. In a second instance, the user applies a lighter force and causes a smaller displacement and receives a smaller haptic effect, resulting in an inconsistent user experience.

To account for this inconsistency, embodiments described herein reference systems and methods for regularizing output of haptic output subsystems of user input components configured to operate as input sensors for an electronic device. In particular, embodiments described herein include a processor or other circuit that regularly samples a force sensor coupled to the body of the user input component so as to determine, in real-time a user force being applied. The sampled user force is divided by a spring constant k that models an elastic component coupling the body of the user input component to a housing part of the electronic device. This division operation results in an estimation of displacement of the body in response to the user's exertion of pressing force. This displacement is thereafter subtracted from a zero-load gap measurement (i.e., a measurement or fixed value representing the zero-load gap separating the attraction plate and a core of the coil, or some other reference point of the coil itself) to obtain a real-time gap estimation.

The gap estimation can thereafter be leveraged to calculate (e.g., via a parametric formula specific to a particular electronic device) or retrieve (e.g., via lookup table) an amount of current to be applied to the coil so as to generate a magnetic field having a magnitude suitable to exert a force against the attraction plate that matches a target force magnitude. Thereafter, the determined current can be applied via a digitally controllable constant current power supply to the coil so as to attract the attraction plate.

In another phrasing, a regularized haptic response from a user input component can be achieved by determining an amount of force assistance to provide to simulate a collapsing dome switch. This target amount of force assistance can be used, along with an estimation of a current gap separating an attraction plate and a core of the coil, to determine what magnitude of current to apply to that coil. In this manner, the same perceived amount of force assistance is provided independent of variations in user pressing force applied.

These foregoing and other embodiments are discussed below with reference to FIGS. 1-4. However, those skilled in the art will readily appreciate that the detailed description given herein with respect to these figures is for explanation only and should not be construed as limiting.

FIG. 1 depicts an example portable electronic device including a haptic button as described herein. The electronic device 100 is depicted as a portable electronic device such as a cellular phone, but it is appreciated that this is merely one example and other electronic device form factors can leverage the systems, devices and methods described herein. Example alternative portable electronic device configurations include but are not limited to: wearable electronic devices (e.g., head mounted, face mounted, ear-worn, wrist-worn, chest-worn, ankle-worn, finger-worn and so on); tablet devices; laptop computing devices; desktop computing devices; industrial control devices; vehicle control or center console devices; accessory devices; input devices; peripheral devices; and so on. The embodiments that follow reference an example portable electronic device implemented as a cellular phone, but it is appreciated that this is merely one example and is not limiting.

The electronic device 100 includes a housing 102 that encloses and supports internal components of the electronic device 100. For example, the housing 102 can enclose and support a display 104 configured to present information to a user of the electronic device 100. For example, a processor of the electronic device 100 can be configured to cooperate with a memory of the electronic device to load from the memory one or more executable instructions that when executed by the processor cause the processor to instantiate an instance of software configured at least in part to render a graphical user interface within an active display area of the display 104. The graphical user interface can be configured to present information to a user and/or may be configured to receive input from a user.

For example the display 104 may include a user input component such as described herein or a conventional user input component such as a capacitive touch sensor. The capacitive touch sensor can detect one or more user inputs to an external surface of the housing 102, such as a cover glass protecting the display 104, and can provide information in respect of user input(s) to the processor. The processor in turn can generate an event and/or hook into a callback of the instance of software to cause the graphical user interface to partially or entirely update, redraw, re-render, or otherwise change in a manner indicating to a user of the electronic device that an input has been received via the display 104.

This foregoing example is merely one example construction and configuration of a display of an electronic device as described herein; many additional configurations are possible.

The electronic device 100 can also include a user input component 108. In this example the user input component 108 extends from an aperture in a sidewall of the housing 102, but it may be appreciated that this is merely one example construction and that the user input component 108 can be positioned in respect of any external surface of the housing 102. In some cases, the user input component 108 extends proud of nearby external surface of the housing 102 (such as depicted in FIG. 1). In other cases, the user input component 108 is flush with nearby housing surfaces. In yet other examples, the user input component 108 is shy of nearby external surfaces.

The user input component 108 includes a body to receive a user pressing force or, more specifically in view of FIG. 1, a pressing force Fi input by a user 110. In particular, the body of the user input component 108 can define an interface surface to receive the user pressing force. The interface surface may be a planar surface, although this is not required of all embodiments. In some examples, a tactile pattern can be defined into/onto the body along the interface surface, such as knurling. In other cases, the interface surface may be partially concave or convex or may include one or more protruding features to serve as locating fiducials for the user 110.

As with other embodiments described herein, the body of the user input component 108 can be movable with respect to local areas of the housing 102. In some cases, the body is configured to translate in plane in respect of an external surface of the housing 102. In other words, the user input component 108 may slide up or down relative to the depicted orientation of FIG. 1.

In other cases, however, the user input component 108 may be configured to pivot in respect of the housing 102. For example, an upper portion of the body of the user input component 108 can depress inwardly to an interior volume of the housing 102 while causing a lower portion of the same body to extend proud of the housing 102. In this example, a fulcrum about which the body may pivot may be internal to the housing 102 and may be centered with respect to a length of the body of the user input component 108.

In many examples, the body of the user input component 108 is configured to press inwardly in respect of the housing 102. More particularly, as the user 110 applies a pressing force, the body displaces inwardly in respect of an exterior surface of the housing 102. For simplicity of description, the following examples are provided in view of this example construction in which a user input component presses inwardly in respect of an electronic device housing, however it is appreciated that other constructions and configurations of a user input component may be possible.

As noted above, FIG. 1 depicts an example construction in which the user input component 108 is configured to displace from a zero-load position, inwardly in respect of the housing 102. As may be appreciated by a person of skill in the art, the user input component 108 may displace different distances in different embodiments and/or in response to different magnitudes of pressing force applied by the user 110.

In these constructions, the body of the user input component 108 can be mechanically and/or elastically coupled to the housing 102. In some cases, a low durometer elastomer may fill a perimeter gap between the body and an internal sidewall of an aperture defined through the housing 102 sized to accommodate the body. In other cases, a mechanical spring structure can be coupled between the body and the housing 102, including one or more leaf springs, flexible members, or other elements configured to elastically deform in response to a user pressing force.

A person of skill in the art may readily appreciate that many flexible mechanical couplings are possible; for simplicity of description, the following embodiments reference a "coupling" between the body of the user input component 108 and the housing 102 that facilitates elastic movement of the body in response to a pressing force of the user 110. The foregoing example is merely one of many.

The coupling, as a flexible and elastic mechanical member, can be modeled by a spring constant. The spring constant may be a scalar value or may be a function that can depend on one or more variables or parameters, such as ambient temperature, ambient pressure, press-release cycle count, force applied, and so on. For simplicity of description, couplings as described herein are referenced in respect of a scalar spring constant k, but it may be appreciated this is merely one example.

The user input component 108 can also include one or more force sensors, such as strain sensors (or other suitable force sensor) coupled to the coupling itself. The strain sensors can measure mechanical strain within the coupling and correlate that mechanical strain to an estimation of magnitude of pressing force applied by the user 110. In addition, the estimated force applied by the user 110 can be combined with the spring constant of the coupling to estimate an amount of displacement of the body of the user input component 108 attributable to the pressing force applied by the user 110.

The user input component 108 can also include a haptic actuator, also referred to as a haptic engine. The haptic engine can include a coil and an attraction plate separated by a gap, which may be defined in respect of a selected reference point relative to the coil, such as a coil core. Constructions vary, but in some embodiments, the gap may be between 0 and 2 mm. in other cases, a larger gap may be possible. One of the elements of the haptic engine is mechanically coupled to the body of the user input component 108 and the other is mechanically fixed within the housing 102. As a result of this construction, an electrical current applied to the coil attracts the attraction plate and causes the body of the user input component 108 to experience an inwardly-directed force in respect of the housing 102. In a more simple phrasing actuation of the haptic actuator moves the body of the user input component 108 in the same direction as the user pressing force applied by the user 110. In this manner, when the haptic actuator is actuated while the user 110 is applying the user pressing force, the actuator assists the user, reducing the among of force required of the user 110 to maintain the same displacement of the body of the user input component 108.

In one embodiment, the haptic actuator is actuated to simulate collapse of a conventional compressible dome of a conventional button. More particularly, as noted above, a conventional button exhibits a force input curve that initially requires an increasing amount of pressing force to be applied by a user, after which the user experiences a perceivable reduction in force which is the collapse of the collapsing dome.

However, also as noted above, attractive force between the coil and the attraction plate varies with the distance between the coil and the attraction plate-which itself can vary by the amount of pressing force input provided by a user. As such, embodiments described herein calculate, in real-time, an amount of current (e.g., 0-2 A, or greater in some embodiments) to apply to the coil of a haptic actuator so as to induce a consistent amount of attractive force ("force assistance") to the body of the user input component 108. Generally and broadly, the farther the gap between the actuator and the core, the more current should be applied to the coil to generate the same magnitude of attractive force.

In particular, the user input component 108 can include a processor or other circuit configured to sample one or more strain sensors or other force sensors coupled to the body of the user input component 108. These samples can be converted to digital values (if sampled in the analog domain) and from the samples of strain, an estimation of the deformation of the coupling can be determined, which in turn can be correlated to an amount of pressing force applied by the user 110. Thereafter, the estimated pressing force can be divided by a spring constant of the coupling to determine an estimate, in real-time, of displacement of the body of the user input component 108 attributable to the user pressing force.

The estimated displacement of the body attributable to user pressing force can in some cases be supplemented or replaced by one or more displacement sensors, such as capacitive gap or separation sensors; many constructions are possible.

Estimated displacement of the body that results from user pressing force can be subtracted from a constant value corresponding to the gap separating the actuator and a core of the coil, resulting in a value that corresponds to a real-time estimation of the gap separating the attraction plate and the coil core. From this estimation, as noted above, an amount of current (e.g., 0-1 A, 1-2 A, or any other suitable current that may vary from embodiment to embodiment) to apply to the coil can be determined, queried, calculated, or otherwise obtained and provided as input to a constant current power source conductively coupled to the coil. The power source applies the selected current to the coil, generating a magnetic field that attracts the attraction plate, thereby providing a regularized haptic output to the user 110. More simply, regardless of the amount of force the user provides to the body of the user input component 108, the haptic response from the electronic device 100 is substantially the same.

These foregoing embodiments depicted in FIG. 1 and the various alternatives thereof and variations thereto are presented, generally, for purposes of explanation, and to facilitate an understanding of various configurations and constructions of a portable electronic device, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
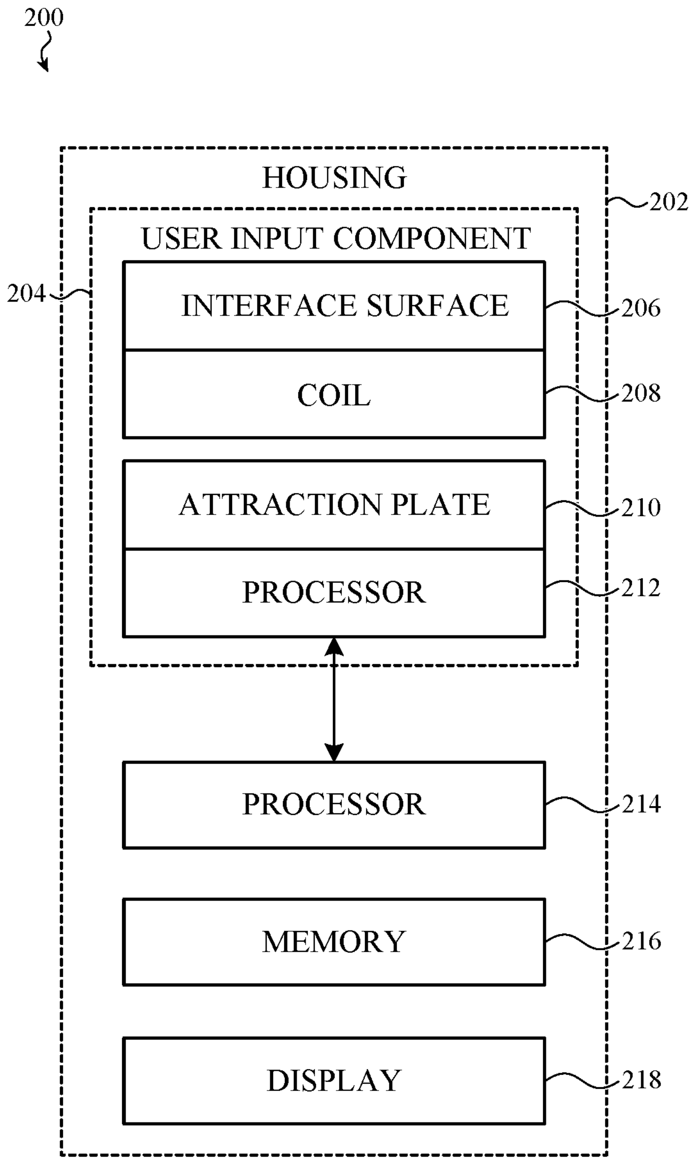
FIG. 2 is a simplified system diagram of an electronic device that can include a haptic button as described herein.

FIG. 2 is a simplified system diagram of an electronic device that can include a user input component (also referred to as a haptic button) as described herein. As with other described embodiments, FIG. 2 depicts an electronic device 200 that can be portable or stationary and may take any suitable form factor. The electronic device 200 includes a housing 202 that encloses and supports a user input component 204, as described herein, in addition to other structural and functional components of the electronic device itself.

The user input component 204 includes a body that is movable with respect to the housing 202. The body is coupled to the housing 202 via a mechanical coupling, such as an elastomer or a flexible metallic structure. The coupling can be suitably configured in any number of suitable ways to facilitate movement of the user input component 204 along one or more directions and/or for pivoting or rotation along one or more axes.

The body includes an interface surface 206 configured to receive a user pressing force. The interface surface 206 is coupled to a coil 208 that at least partially defines a haptic engine. The haptic engine also includes an attraction plate 210 that is separated from the coil 208 by a gap. Aa a result of this construction, when a current is applied to the coil 208, a magnetic field generated by the coil 208 attracts the attraction plate and exerts a downward (relative to the orientation of FIG. 2) force against the interface surface 206. In this manner, current applied to the coil 208 assists a user applying a pressing force. This assistance can be perceived by the user as a mechanical release or relief, similar to a collapsing dome switch.

The user input component 204 also includes a processor 212 configured to receive input from one or more strain sensors or other force sensors coupled to the interface surface 206 and/or the coupling serving as a mechanical linkage between the user input component 204 and the housing 202. In some cases, the processor 212 is configured to sample, via an analog to digital converter, analog values corresponding to one or more electrical properties of the strain sensors. For example, changes in strain may result in changes to resistance or inductance or capacitance of the strain sensor. Raw sampled values from these strain sensors may therefore be required to be converted, scaled, or otherwise modified to result in a digital value corresponding to a measurement of strain at a given sampling time.

The strain measurement obtained by the processor 212 can directly correlate to an amount of pressing force applied by a user of the electronic device 200. In some cases, factory calibration operations can be performed to correlate strain sensors disposed along a coupling as described herein to different quantities of user input pressing force. In other cases, a strain sensor strain value can be scaled by a scalar value to result in an estimation (in any suitable unit) of pressing force input.

The processor 212 thereafter can leverage the estimated force input at a given sampling time to determine an estimated displacement of the body of the user input component 204 resulting form that force. Specifically, the processor 212 can divide from the force applied a spring constant k that models behavior of the coupling. The spring constant can be determined, in some examples, during factory calibration operations. In some cases, the spring constant may vary given different environmental conditions, for example temperature. In these examples, a different, temperature-dependent, spring constant may be selected from a set of spring constants for example stored in a lookup table. Many constructions are possible.

In this example, the processor 212 thereafter obtains an estimation of displacement of the body of the user input component 204. This estimation can be subtracted from a stored zero-force/zero-load value that corresponds to the gap between the attraction plate 210 and a core of the coil 208. The resulting value may approximate and/or otherwise serves as a proxy for a real-time distance between the attraction plate 210 and the coil 208. As with other embodiments described herein, this estimation can be used to select a drive current for the coil 208. The drive current can be selected from a lookup table, a database, or may be calculated in real time. A value corresponding to the selected drive current can be provided as input to a constant current power supply, thereby ensuring that the resulting force of attraction between the coil 208 and the attraction plate 210 is substantially consistent.

In many embodiments, actuation of the haptic engine can be triggered by a particular threshold amount of pressing force. In other cases, multiple pressing force thresholds can be associated with the user input component 204 such that different amounts of force applied by the user result in different haptic effects by the haptic engine. More generally and broadly, it may be appreciated that in some embodiments the user input component 204 can exhibit a software-defined button response, including a single or multiple compressible domes or detents.

More particularly, as with other embodiments described herein, the electronic device 200 can include a processor 214, a memory 216, and a display 218. The processor 214 can be configured to cooperate with the memory 216 to instantiate an instance of software that renders a graphical user interface within an active display area of the display 218. This software may be configured to provide one or more instructions to the processor 212 that configure the processor 212 to impart particular haptic effects in response to particular force inputs by a user.

For example, the software instantiated by the processor 214 and the memory 216 may configure the processor 212 to provide a first haptic response once a user pressing force input exceeds a first threshold and to provide a second haptic response once a user pressing force input exceeds a second threshold. As one example, the user input component 204 may be configured to operate as a shutter button of a camera application in which a light-force press triggers a light haptic response and causes an focus function to execute. A second, higher-force application of force may trigger a shutter operation. This is merely one example; many constructions are possible.

These foregoing embodiments depicted in FIG. 2 and the various alternatives thereof and variations thereto are presented, generally, for purposes of explanation, and to facilitate an understanding of various configurations and constructions of a portable electronic device and a user input component, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
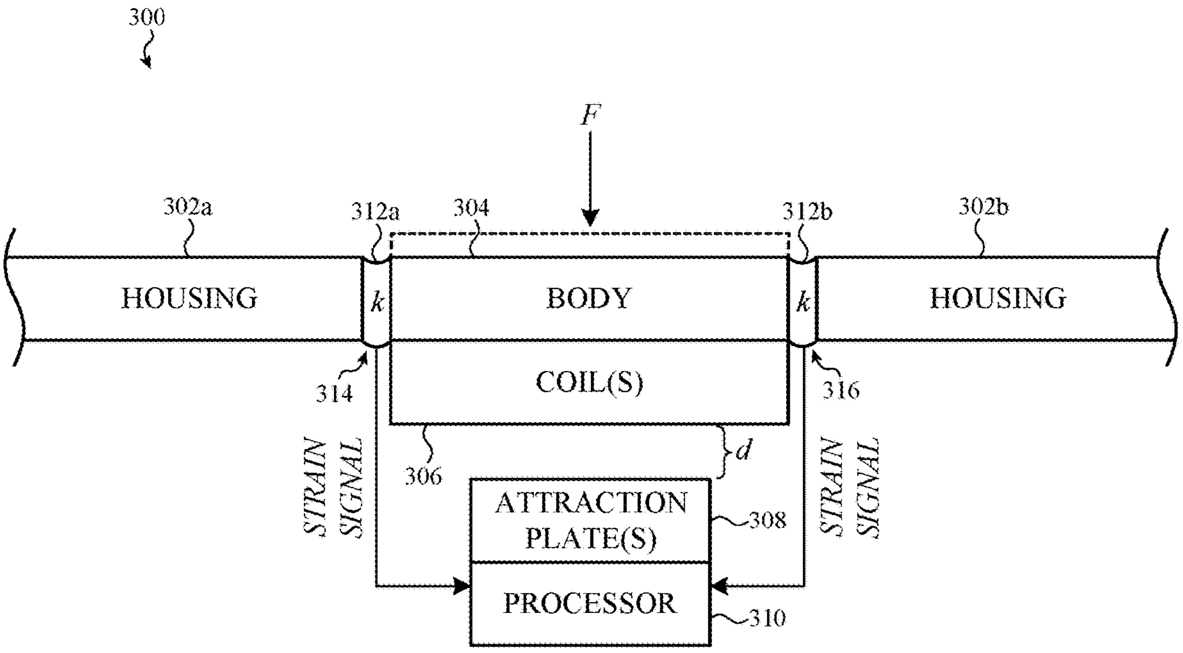
FIG. 3 depicts a simplified system diagram of a haptic button as described herein.

FIG. 3 depicts a simplified system diagram of a haptic button as described herein. The illustrated embodiment depicts an electronic device 300 with a user input component, such as described herein. The user input component (also referred to as a haptic button) includes a housing 302 through which a movable surface defined by a body 304 extends. In another phrasing the housing 302 or a sidewall thereof defines an aperture through which the body 304 can extend. In some cases, an interface surface of the body 304 extends beyond a surface of adjacent portions of the housing 302 (such as the housing portion 302*a* and the housing surface portion 302*b*) whereas in other cases, the body may be flush with the housing 302.

The body can be coupled to one or more coils, identified in FIG. 3 as the coil 306 that are separated from one or more attraction plates by a gap. Specifically in the illustrated embodiment, the coil 306 is separated by a distance d from the attraction plate 308. The coil 306, as with other embodiments described herein can be conductively or otherwise operably coupled to a processor 310 that can be configured to control, coordinate, or otherwise execute operations and functions of the user input component. Specifically, the processor 310 can be configured to monitor strain experienced by a coupling 312 (depicted as the coupling portions 312*a*, 312*b*) that mechanically couples the body 304 to the housing 302. Specifically the processor 310 is coupled to one or more strain sensors, such as the strain sensor 314 and the strain sensor 316 that may be disposed on a surface of the coupling 312 (or, respectively, portions of the coupling such as the coupling portions 312*a*, 312*b*). The strain sensors may be piezoelectric strain sensors, strain gauges, load cells, or any other suitable mechanical or electrical structure configured to produce or modify an electrical signal in proportion to mechanical strain. The processor 310 receives a strain signal and/or samples the strain sensors to determine an amount of pressing force F applied by a user to the interface surface of the body 304. In response, the processor 310 determines—such as described above—an appropriate drive current to apply to the coil 306 in order to provide a consistent haptic effect.

Figure 4:
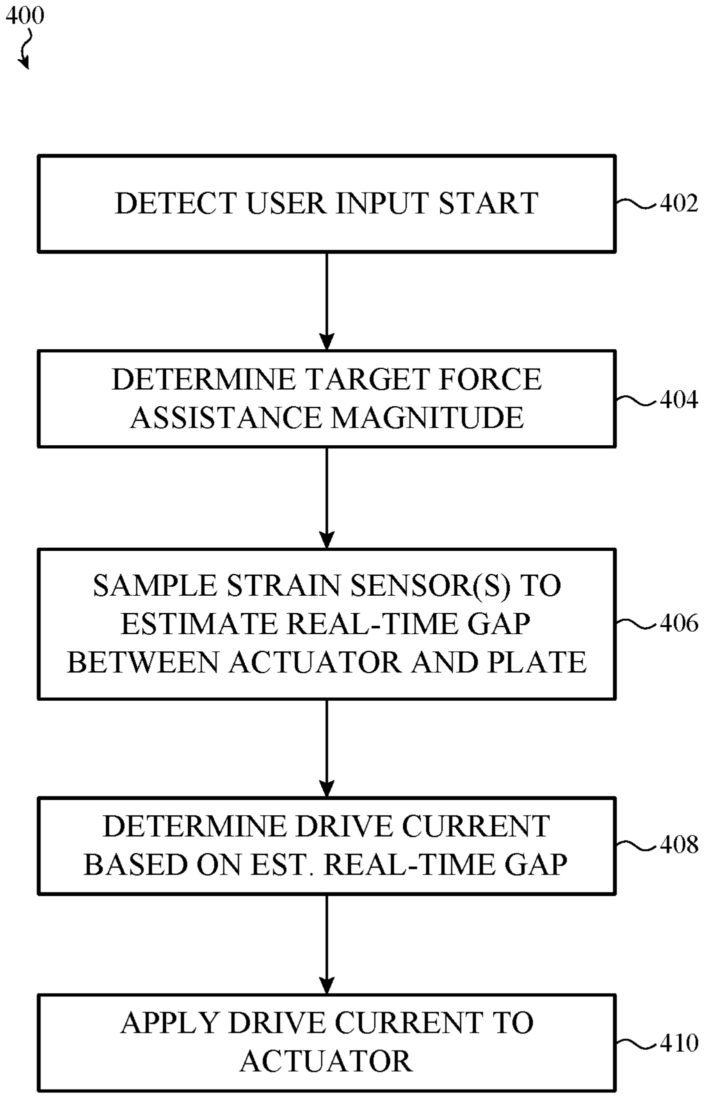
FIG. 4 is a flowchart depicting example operations of a method of regularizing output from a haptic button, as described herein.

FIG. 4 is a flowchart depicting example operations of a method of regularizing output from a haptic button, as described herein. The method 400 can be performed by a number of suitable hardware or software combinations; in many embodiments, the method 400 is performed at least in part by a processor such as a processor of a user input component as described above.

The method 400 includes operation 402 at which a start of a user pressing input is detected. In some cases, the pressing input can be detected from a strain sensor, whereas At operation 404, a target force assistance can be determined. Specifically, the magnitude of force to be provided as haptic output by attracting an attraction plate with a coil, such as described above. The target force assistance can be selected based on an operational setting of the electronic device and/or the user input component.

Thereafter, at operation 406, a magnitude of force input can be detected such as described above. Specifically, by sampling one or more strain sensors or equivalent structure, a processor of the user input component can estimate or approximate within reasonable tolerances a magnitude of force input being applied by a user in real time. As with other embodiments described herein, this force input can be correlated to a real-time estimation of a distance/gap separating a coil core and attraction plate.

At operation 408, the estimation of gap between the coil core and attraction plate can be used to select a drive current for the coil so as to provide a standard, predictable, regularized haptic output. At operation 410, the selected current can be applied to the coil.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of some embodiments, whether or not such embodiments are described and whether or not such features are presented as being a part of a described embodiment. Thus, the breadth and scope of the present description should not be limited by any of the above-described exemplary embodiments but is instead defined by the claims herein presented.

What is claimed is:

1. An electronic device comprising:
- a housing defining an aperture; and
- a user input component comprising:
  - a body defining an interface surface extending at least partially through the aperture;
  - a coupling elastically connecting the body to the housing such that the body is movable with respect to the housing in response to a user pressing force applied to the interface surface;
  - a strain sensor coupled to the coupling;
  - a haptic engine coupled at least partially to the body and comprising:
    - a coil; and
    - an attraction plate separated, in absence of the user pressing force, from a core of the coil by a first gap; and
  - a processor operably coupled to the strain sensor and the coil and configured to:
    - sample the strain sensor to determine a magnitude of the user pressing force;
    - determine, from a spring constant associated with the coupling, a second gap corresponding to a displacement of the body in response to the user pressing force;
    - approximate a real-time distance separating the coil and the attraction plate from the second gap and the first gap;
    - based on the real-time distance separating the coil and the attraction plate, selecting a magnitude of current to drive the coil; and
    - causing the selected magnitude of current to be applied to the coil.

2. The electronic device of claim 1, wherein the body sits at least partially proud of an exterior surface of the housing.

3. The electronic device of claim 1, wherein the body is configured to slide in response to the user pressing force.

4. The electronic device of claim 1, wherein the body is configured to pivot in response to the user pressing force.

5. The electronic device of claim 1, wherein the body is configured to rotate in response to the user pressing force.

6. The electronic device of claim 1, wherein the magnitude of current is selected from a lookup table stored in a memory.

7. The electronic device of claim 1, wherein the coupling is constructed at least in part from metal.

8. The electronic device of claim 1, wherein the coil is configured to attract the attraction plate so as to induce a force that draws the body into an internal volume of the housing.

9. The electronic device of claim 1, wherein the user input component comprises a pressable button.

10. A user input component for a portable electronic device, the user input component comprising:
- a body defining an interface surface to receive a user pressing force;
- a force sensor coupled to the body and configured to determine a magnitude of the user pressing force;
- a haptic engine at last partially coupled to the body; and
- a processor operably coupled to the force sensor and configured to:
  - sample the force sensor to determine a real-time measurement of magnitude of the user pressing force;
  - determine, from a spring constant associated with the user input component, a gap corresponding to a displacement of the body in response to the user pressing force;
  - determine a real-time distance separating a first and second component of the haptic engine based on the determined gap; and
  - based on the real-time distance, selecting a magnitude of current to drive the haptic engine.

11. The user input component of claim 10, wherein:
- the haptic engine comprises a coil and an attraction plate; and
- the first component is the coil; and
- the second component is the attraction plate.

12. The user input component of claim 11, wherein the coil is coupled to the body.

13. The user input component of claim 11, wherein the attraction plate is coupled to the body.

14. The user input component of claim 10, wherein the processor is configured to select the spring constant from a set of spring constants.

15. The user input component of claim 14, wherein the spring constant is selected at least in part based on temperature.

16. The user input component of claim 10, wherein the force sensor comprises a strain sensor coupled to a flexible member in turn coupled to the body.

17. A method of regularizing haptic output of a haptic engine of a user input component for a portable electronic device, the method comprising:

determining a magnitude of force input applied by a user to an interface surface of the user input component;

determining a displacement of the interface surface resulting from the force input;

determining a gap separating two attracting components of the haptic engine based on the displacement; and determining an electric current to apply to drive the haptic engine based on the determined gap.

18. The method of claim 17, wherein the electric current is selected form a lookup table.

19. The method of claim 17, comprising applying the determined electric current to the haptic engine.

20. The method of claim 17, wherein the haptic engine comprises a coil and an attraction plate, the coil configured to receive the determined electric current.

* * * * *